United States Patent
Diggs et al.

(10) Patent No.: US 8,095,851 B2
(45) Date of Patent: Jan. 10, 2012

(54) STORAGE SUBSYSTEM CAPABLE OF ADJUSTING ECC SETTINGS BASED ON MONITORED CONDITIONS

(75) Inventors: Mark S. Diggs, Laguna Hills, CA (US); David E. Merry, Jr., Irvine, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 1160 days.

(21) Appl. No.: 11/851,288

(22) Filed: Sep. 6, 2007

(65) Prior Publication Data
US 2009/0070651 A1 Mar. 12, 2009

(51) Int. Cl.
*G11C 29/00* (2006.01)
(52) U.S. Cl. .......................... 714/763; 714/752; 714/723
(58) Field of Classification Search .................. 714/763, 714/752, 710, 723, 54, 8; 711/104, 202
See application file for complete search history.

(56) References Cited

U.S. PATENT DOCUMENTS

| | | | |
|---|---|---|---|
| 5,974,573 A | 10/1999 | Martin | |
| 6,327,689 B1 | 12/2001 | Tian | |
| 6,523,132 B1 * | 2/2003 | Harari et al. ................. | 714/6.13 |
| 6,747,827 B1 | 6/2004 | Bassett et al. | |
| 6,838,331 B2 | 1/2005 | Klein | |
| 7,124,329 B2 | 10/2006 | Ackaret et al. | |
| 7,171,605 B2 | 1/2007 | White | |
| 7,184,351 B2 | 2/2007 | Ito et al. | |
| 7,340,581 B2 * | 3/2008 | Gorobets et al. .............. | 711/202 |
| 2002/0066052 A1 | 5/2002 | Olarig et al. | |
| 2002/0069317 A1 * | 6/2002 | Chow et al. ................... | 711/104 |
| 2002/0178421 A1 | 11/2002 | Hassner et al. | |
| 2003/0037299 A1 | 2/2003 | Smith | |
| 2003/0145270 A1 | 7/2003 | Holt | |
| 2005/0172179 A1 | 8/2005 | Brandenberger et al. | |
| 2006/0248434 A1 | 11/2006 | Radke et al. | |

OTHER PUBLICATIONS

International Search Report and Written Opinion in PCT Application No. PCT/US2008/75286; Dated Nov. 14, 2008 in 11 pages.
European Search Report dated Oct. 12, 2011 received in Application No. 08799187.3 in 9 pages.

* cited by examiner

*Primary Examiner* — Fritz Alphonse
(74) *Attorney, Agent, or Firm* — Knobbe Martens Olson & Bear LLP (57) ABSTRACT

A storage subsystem monitors one or more conditions related to the probability of a data error occurring. Based on the monitored condition or conditions, the storage subsystem adjusts an error correction setting, and thus the quantity of ECC data used to protect data received from a host system. To enable blocks of data to be properly checked when read from memory, the storage subsystem stores ECC metadata indicating the particular error correction setting used to store particular blocks of data. The storage subsystem may be in the form of a solid-state non-volatile memory card or drive that attaches to the host system.

29 Claims, 4 Drawing Sheets

STORAGE SUBSYSTEM CAPABLE OF ADJUSTING ECC SETTINGS BASED ON MONITORED CONDITIONS

BACKGROUND

1. Technical Field

The present disclosure relates to solid-state storage subsystems. More specifically, the present disclosure relates to the use of error correction codes in solid-state storage subsystems.

2. Description of the Related Art

Solid-state storage subsystems are used to store a wide variety of data. With increasing memory capacity, a mixture of information (e.g., program files, set-up files, user data, etc.) corresponding to a variety of storage applications can be conveniently stored on a single solid-state storage subsystem, such as a removable flash memory card or drive that attaches to a host computer. Many of these storage applications demand high levels of data integrity over the life of the subsystem.

Error Correcting Codes (ECC) are sometimes used in a solid-state storage subsystems to increase data integrity. During write operations, the storage subsystem calculates ECC values that describe the write data, and stores these ECC values in non-volatile memory with the write data. On read operations, the storage subsystem determines whether the ECC values read from memory describe the corresponding data values read from memory. If an ECC error is detected (i.e., the ECC does not describe the data), the storage subsystem can, in some cases, correct the error before returning the data to the host.

The ability of the storage subsystem to detect and correct errors can be increased by increasing the quantity of ECC bits stored per unit of data. However, such increases in the quantity of ECC used generally decreases the performance of the storage subsystem and may require additional (i.e., off-sector) storage space when the quantity of ECC data is larger than the amount of management data provided for each sector.

SUMMARY OF THE DISCLOSURE

Thus, there is a need for a storage subsystem that more efficiently balances the need for increased ECC with performance demands. In one embodiment, this objective is achieved by providing a solid-state storage subsystem that automatically adjusts the level of ECC (and thus the number of ECC bits stored per unit of data) based on one or more monitored or detected conditions. For example, the storage subsystem may adjust the ECC level used for write operations based on one or more of the following conditions: (1) the current temperature sensed by a temperature sensor, (2) the stability of the power signal received by the host, (3) the rate at which ECC errors are detected on read operations, (4) the current wear level of the non-volatile memory array, as tracked by the storage subsystem, (5) a vibration level detected by a vibration sensor, (6) the voltage level of a battery or other internal power source, if such a power source is provided. When the monitored condition or conditions reveal an increased probability of data errors, the ECC level and thus the quantity of ECC data generated is increased, increasing the level of protection against data errors. The storage subsystem also stores ECC metadata that indicates the particular ECC level used on particular write operations, such that the appropriate ECC level and method can be used to later perform ECC checking of such data.

In some embodiments, the storage subsystem may also implement one or more non-standard or "vendor-specific" commands that enable the host system to control the ECC level used, and/or to control the parameters used by the storage subsystem to select the ECC level. For example, the storage subsystem's command set may enable the host to place the storage subsystem in a "fixed-ECC-level mode" in which a host-designated ECC level is used for all write operations. As another example, the command set may enable the host to specify maximum and minimum ECC levels to be used. As yet another example, the command set may enable the host to specify the types of conditions to be monitored for purposes of varying the ECC level, and/or the ECC levels to be used when specific types of conditions or parameter thresholds are detected.

Neither this Summary nor the following Detailed Description purports to define the invention. The invention is defined by the claims.

BRIEF DESCRIPTION OF THE DRAWINGS

Specific embodiments of the inventions will now be described with reference to the following drawings, in which.

DETAILED DESCRIPTION OF SPECIFIC EMBODIMENTS

The following description is intended to illustrate specific embodiments of the invention, and not to limit the invention. Thus, nothing in this detailed description is intended to imply that any particular feature, characteristic or component is essential to the invention. The invention is defined only by the claims.

The present invention comprises a storage subsystem that monitors one or more conditions related to the probability of a data error occurring. Based on the monitored condition or conditions, the storage subsystem adjusts an error correction setting, and thus the quantity of ECC data used to protect data received from a host system. To enable blocks of data to be properly checked when read from memory, the storage subsystem stores ECC metadata indicating the particular error correction setting used to store particular blocks of data. In some embodiments, the storage subsystem may also support one or more special commands for enabling the host system to directly or indirectly control the ECC level used.

Figure 1:
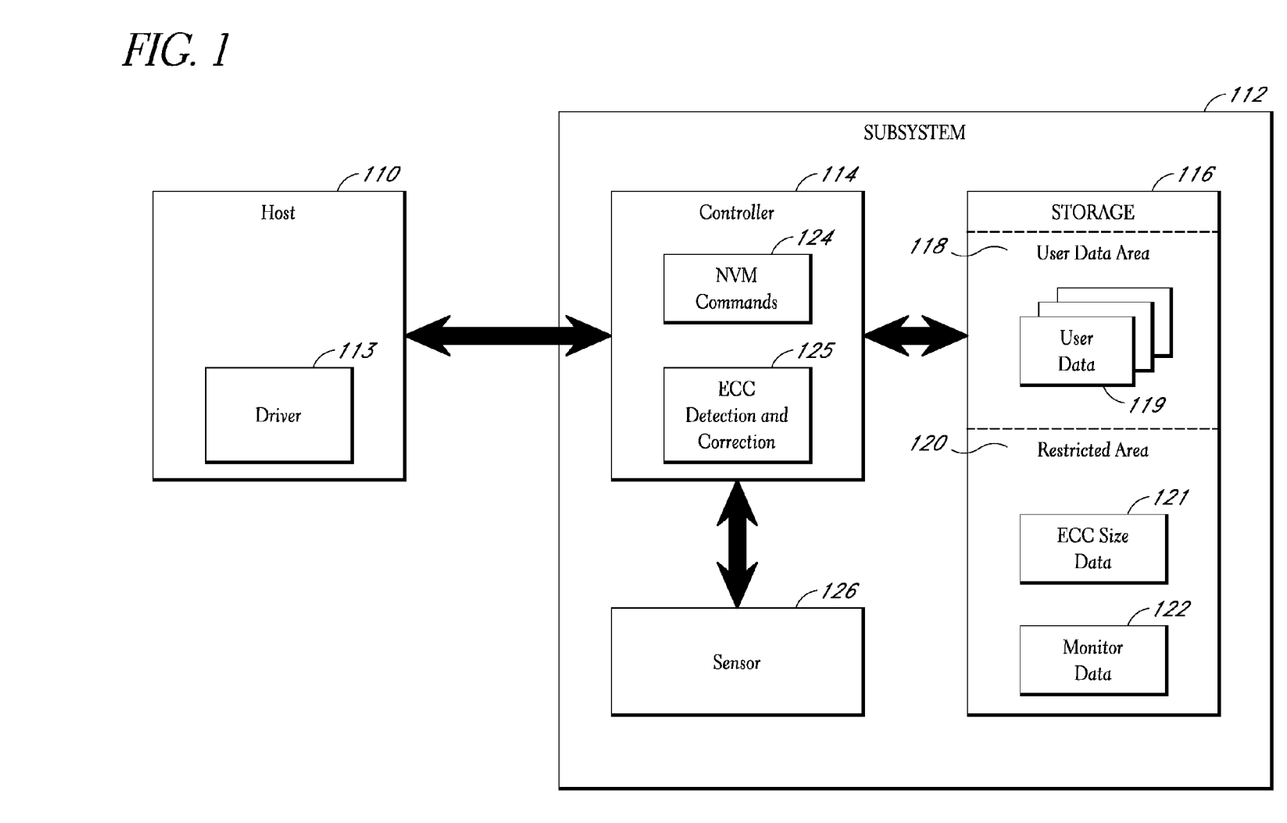
FIG. 1 is a block diagram illustrating a host system linked to a solid-state storage subsystem that is capable of automatically adjusting ECC settings according to one embodiment.

FIG. 1 is a block diagram illustrating a host system 110 connected to a storage subsystem 112 according to one embodiment. The host system 110 may, for example, be a portable computer, a workstation, a router, a handheld instrument system, a computing kiosk, a blade server, a military system, a flight computer, or any other type of computing device. The host system 110 stores data on the storage subsystem 112, and may provide operating system functionality and a boot process for the storage subsystem 112. The host system 110 executes a driver program 113 that provides functionality for communicating with the storage subsystem 112, such as by issuing commands in accordance with an ATA signal interface or other standard. In certain embodiments, the driver 113 may communicate with, or be part of, one or more software applications that are specifically configured to use the storage subsystem 112. The storage subsystem 112 may be in the form of a detachable device, such as a solid-state memory card or drive that plugs into a slot or external port of the host system 110. The storage subsystem may comply with one or more of the following specifications: CompactFlash, PCMCIA, SmartMedia, MultiMediaCard, SecureDigital, Memory Stick, ATA, ATAPI, PCI Express, PCI Mezzanine Card, AdvancedTCA Mezzanine Card, SATA, or Universal Serial Bus.

The storage subsystem 112 comprises a storage array 116, and a controller 114. The storage array 116 is preferably a non-volatile memory implemented using solid-state memory devices, but may additionally or alternatively be implemented using magnetic disk drives, volatile memory devices (e.g., DRAM or SRAM) backed up by battery, or another type of storage device.

The storage array 116 is subdivided into a user data area 118 and a restricted area 120. The address ranges of these two areas need not be contiguous; for example, portions of the restricted space may be interleaved with portions of the user data space. The user data area 118 is read/write accessible via standard (e.g. ATA) access commands, and is used by the controller 114 to implement a conventional file system (e.g., FAT16 or FAT32). Thus, the user data area 118 is available to host applications and the host operating system to store and retrieve user data 119. The restricted memory area 120 is preferably accessible only via one or more non-standard or "vendor-specific" commands, and thus is not exposed to the host's operating system and applications. Stated differently, the standard memory access command codes used to access the subsystem's user data memory area 118 do not provide access to the restricted area 120. As described below, the restricted area 120 is used to store configuration and control information, including information such as monitor data 122 and the error correction settings used to encode each block of user data 119. In other embodiments of the invention, either a user data area 118 or a restricted memory area 120 may be omitted. In some embodiments, data described herein as being stored in the restricted memory area 120 is stored in the user data memory area 118.

The restricted memory area 120 may also be used by the controller 114 to store other types of control information. For example the restricted memory area 120 may store firmware executed by the controller 114, security information for controlling access to the user data area 118, and/or wear level data reflective of the wear level of each sector or block of the storage array 116.

As is conventional, the controller 114 is configured to write data to, and read data from, the storage array 116 in response to commands from the host 110. In one embodiment, the controller 114 is an ATA flash disk controller that executes a firmware program which embodies the various features described herein. Some or all of the functions of the controller 114 may alternatively be fully automated in application-specific circuitry such that no firmware is needed. The controller 114 is typically implemented as a single integrated circuit device, but may alternatively comprise multiple distinct devices.

The controller 114 of storage subsystem 112 is further configured with non-volatile memory (NVM) commands 124. NVM commands 124 may be used to access storage array 116 of the storage subsystem 112 in response to data and instructions received by the controller 114 from host system 110. NVM commands 124 may include read commands, write commands, CopyBack commands, Two-Plane Page Program commands, and the like. Certain NVM commands 124 may be determined to be more likely to cause errors in data storage.

The controller 114 further includes an ECC detection and correction module 125. During write operations, the ECC detection and correction module 125 (hereinafter "ECC module") uses a currently-selected ECC level or method to generate ECC values for the write data received from the host. As is conventional, these ECC values are stored in conjunction with the data to which they correspond. The process of generating and storing ECC values is referred to as "encoding," and the process of performing ECC checking and correcting is referred to as "decoding." The storage subsystem may use a single ECC algorithm for all encoding and decoding operations, or may use different ECC algorithms for different ECC levels or settings. Examples of types of ECC codes/algorithms that may be used include Reed-Solomon, Hamming, BCH, Reed-Muller, Binary Golay, convolutional, and turbocode. The particular ECC algorithm and level used to encode a particular block of data is also used to decode this data during subsequent read operations.

The storage subsystem implements multiple ECC levels or settings, each of which corresponds to a different quantity of ECC bits per unit of data. A relatively high ECC level (more ECC bits per unit data) corresponds to a relatively high capacity to detect and correct errors. The amount of processing resources (and thus processing time) and storage resources used by the controller 114 to generate and check ECC values is generally proportional to the ECC level currently being used.

In one embodiment, the storage subsystem implements two ECC levels or settings, and uses Reed-Solomon encoding for both settings. At the first setting, the ECC module 125 generates two bytes of ECC per 512-byte sector, and is capable of correcting a single byte error (regardless of the number of bit errors in this single byte). The time required to compute the ECC in this setting, and to perform ECC checking, is relatively small, and performance is relatively good. The potential for avoiding data errors is also good. At the second (higher level) setting, ten bytes of ECC are generated for each 512-byte sector, and up to five byte errors can be corrected. Because the processing time needed to compute and check ECC values associated with this setting is relatively high, the subsystem's performance is relatively low. However, the potential for avoiding data errors is excellent. Accordingly, the first setting above may be appropriate for low risk conditions and/or for non-critical data, and the second setting may be appropriate for high risk conditions and/or for critical data.

Although two settings are used in this example, any number of settings/levels can be used (e.g., 3, 4, 5, 6, 7, . . . n). For example, in some embodiments, an ECC module 125 is used that has five different error correction settings corresponding to five different levels of protection. Each setting corresponds to a different number of byte errors that may be corrected. For example, the five error correction settings may correspond to the capability to correct one, two, three, four, and five byte errors (respectively) in a 512 byte sector using a Reed-Solomon ECC algorithm, and may use two, four, six, eight, and ten ECC bytes, respectively. Large quantities of ECC data may be handled by storing the ECC data off-sector. Further, the quantity of ECC data generated at each ECC level need not be a multiple of eight bits; for example, twelve bits of ECC data may be used for each 512-byte sector of data.

In some embodiments, the ECC module 125 is implemented in firmware (program instructions) executed by the controller 114. Some or all of the functions of the ECC module 125 may alternatively be fully automated in application-specific circuitry, such as an ASIC (Application-Specific Integrated Circuit) or FPGA (Field Programmable Gate Array). The ECC module 125 is typically implemented in the controller 114, but may alternatively comprise one or more distinct devices. Although depicted as a single module or unit in FIG. 1, the ECC module 125 may include one module or circuit that handles ECC encoding, and another module or unit that handles ECC decoding.

The storage system 112 in the illustrated embodiment further includes a sensor 126 that transmits data/signals indicative of sensed environmental conditions such as temperature, humidity, altitude, or storage subsystem movement. The sensor data detected by the sensor 126 may be transmitted to the controller 114 and stored in the restricted area 120 of the storage array 116. Although a single sensor 126 is shown, multiple sensors may be provided for monitoring multiple types of environmental conditions. In addition, in some embodiments, the storage subsystem may not include a sensor 126.

The sensor data is one type of monitor data 122 that may be stored by the storage subsystem 112 and used to select an ECC level. Other types of monitor data include parameters that may be sensed or generated by the controller 114 or by another circuit of the storage subsystem. For example, the controller 112 may generate and store monitor data that describes the stability of the power signal from the host (e.g., number of anomalies detected per unit time, average anomaly duration, etc.), as detected by a power-anomaly detection circuit. As another example, the controller 112 may generate and store monitor data descriptive of how frequently ECC errors are detected. Other examples of types of monitor data that may be collected include bit error rate, duration since last subsystem power-up event, average subsystem ON time, average wear level of non-volatile memory array. The monitor data may include event timestamps that indicate when the associated measurements were taken or when the associated anomalies were detected. As illustrated in FIG. 1, the monitor data 122 may be stored in the restricted memory area.

The controller 114 accesses and analyzes the stored monitor data 122 to select the appropriate ECC settings for encoding data. For example, the monitor data 122 may indicate that the storage subsystem 112 is operating in an extreme temperature (e.g., over 60° C.). In that case, the ECC module 125 can be set to the second error correction setting described above (or some other setting determined as described below). In this mode, an increased number of ECC bytes will be generated to compensate for the higher probability of data errors. If monitor data 122 indicates instead that monitored operating condition or conditions, such as the temperature, is/are within normal limits, then the ECC module 125 may be set to the first error correction setting. In this setting, a smaller number of ECC bytes are used since the probability of a data error is relatively low. Thus, a higher level of performance (in terms of throughput) is achieved.

The controller 124 may access the monitor data 122 and set the ECC level periodically (e.g., once every N seconds), and/or in response to certain events such as power-on events, ECC error events, or power anomaly events. Where multiple types of operating conditions are monitored, the controller 124 may generate a score that represents a likelihood of data error occurring. This score may be based on multiple types of monitor data (with different amounts of weight optionally being given to different types of monitor data), and may be used to select the appropriate ECC level.

In addition or as an alternative to setting the ECC level based on stored monitor data 122, the controller 114 may set the ECC level based on certain types of events. For example, a power anomaly detection circuit or a temperature sensor may interrupt the controller 114 upon detecting an anomalous condition, and the controller may automatically respond by setting the ECC setting to the maximum level.

In order to properly detect and correct stored data when it is accessed, the ECC module 125 must determine how the error correcting bytes were originally encoded. Accordingly, when the ECC module 125 writes encoded user data 119 to the user data area 118 of the storage array 116, the ECC module 125 may also store ECC size data 121 (also referred to as ECC metadata) in the restricted area 120. The ECC size data 121 may indicate, for each block of user data 119 stored in the storage array 116, the error correction setting used to encode that user data 119. When that block is read by controller 114 and processed by ECC module 125 in response to instructions from host system 110, the ECC size data 121 is read to determine the appropriate error correction setting to use for decoding the accessed data.

Figure 2:
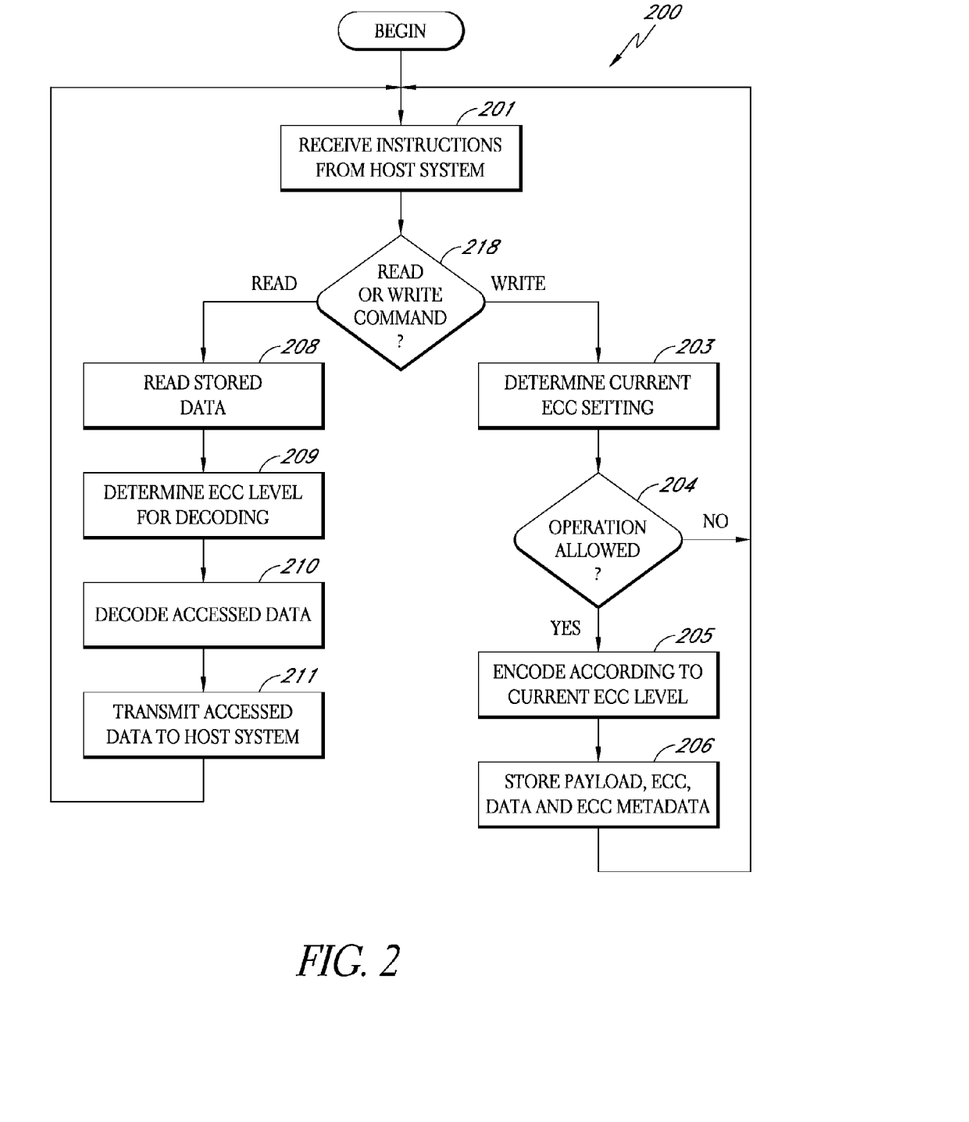
FIG. 2 is a flow chart illustrating a process for encoding and decoding data stored in the memory of the storage subsystem according to one embodiment.

FIG. 2 shows a process 200 for writing data to or reading data from the storage array 116 of storage subsystem 112 according to one embodiment. This process may be embodied in firmware executed by the controller 114, and/or in application-specific circuitry of the controller. Process 200 begins at state 201 when instructions and any accompanying payload data are received from the host system 110.

At decision state 202, the controller 114 interprets the host system instructions. The host system instructions are determined to be, for example, either read or write commands. The instructions may correspond to other types of commands in some embodiments. A skilled artisan will readily appreciate that certain steps of the process shown here may be modified, added, or omitted according to different embodiments and according to different memory access commands. According to the process 200 shown, if the host system 110 is attempting to write data to the storage array 116 of the storage subsystem 112, then the process 200 proceeds to state 203. If the host system 110 is attempting to read data from the storage array 116 of the storage subsystem 112, then the process 200 proceeds to state 208.

At process state 203, the ECC module 125 determines the current ECC setting. The current setting may, for example, be represented as a bit or set of bits maintained in an internal register of the controller 114.

Figure 4:
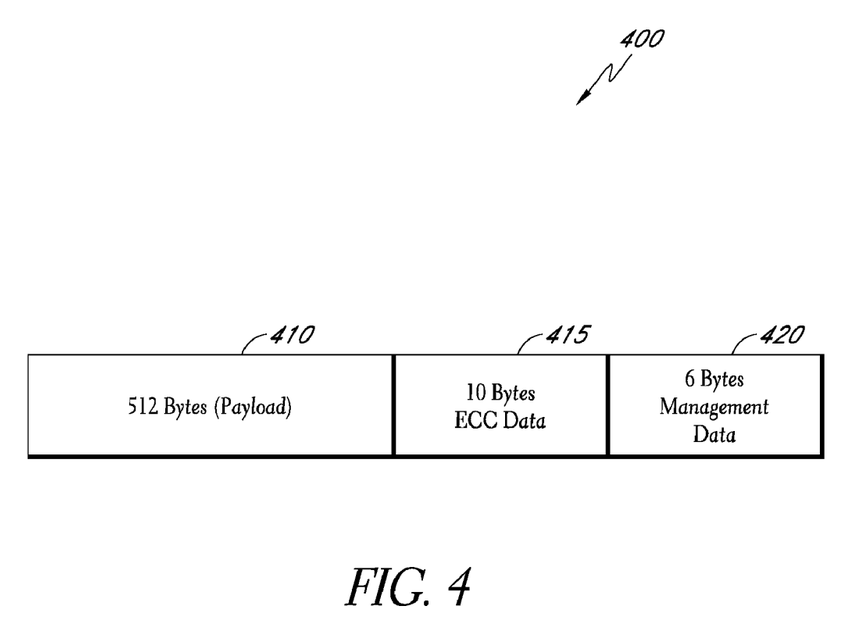
FIG. 4 is a diagram illustrating the structure of a data block according to one embodiment.

At state 204, payload data transmitted to the storage subsystem 112 by host system 110 with the instructions is encoded according to the current error correction setting determined at state 203. For example, in some embodiments, when an error correction setting is determined to correspond to a first setting, then two error correcting bytes are utilized for each 512 byte data payload. When the error correction setting corresponds to a second setting, then ten error correcting bytes are utilized for each 512 byte data payload. FIG. 4 illustrates one embodiment of a format for an encoded data block 400. The 512 byte data payload 410 may be stored, for example, with 16 bytes of additional data including the ECC data 415 and the management data 420. In the embodiment shown, 10 bytes are assigned for ECC data. Management data 420 includes ECC size data and is assigned 6 bytes. Each block then corresponds to 528 bytes, regardless of the actual number of ECC bytes used. In some embodiments, data blocks having different formats and sizes may be utilized. When the quantity of ECC data used is larger than available space in the additional data area, it is still possible to store larger amounts of ECC data off-sector.

At state 205, the encoded data including the payload data received from the host system 110, error correcting bytes encoded by the ECC module 125, and other data are stored in the user data section 118 of storage array 116. ECC size data 121 indicating the error correction setting is stored at state 206 in the restricted memory area 120. In some embodiments, ECC size data 121 is stored in the user data section 118. The ECC size data 121 may be related to each block, so that this data may be read by the controller 114 in order to determine an error correction setting to use in decoding the stored data when that data is read. After the encoded data and the ECC size data 121 are both stored in the storage array 116, the process 200 returns to state 201 and awaits instructions from the host system 110.

According to some embodiments, states 204 and 205 may be modified based on the instructions received from the host system 110 and the current ECC setting determined at state 103. For example, certain NVM commands 124 may not be allowed to be performed by the controller for some error correction settings. Commands such as CopyBack commands, Cache Program commands, or Two-Plane Page Program commands may be determined to be vulnerable to extreme conditions. That is, these commands may result in a higher probability of data errors under these conditions. When extreme conditions are detected as reflected in the error correction setting, the controller 114 may modify these commands or prevent them from being performed. With a CopyBack command, data read back from a NVM array may have ECC processes performed thereon in order to reduce the risk of data errors. Cache Program commands and Two-Plane Page Program commands may be avoided The data may instead be written without caching or using Single-Plane commands, which may decrease the risk of data loss and increase accuracy even though the performance/speed may decrease. Other operations by the controller on the storage array 116 may also be modified or prevented based on the probability of data errors at the current operating conditions.

If the instructions received from the host system at state 202 correspond to some type of read command, then the process 200 continues to state 208. At state 208, the requested data, ECC data, and ECC size data 121 are read from the storage array 116. The ECC size data 121 is used by the ECC module 125 to determine an error correction setting for the data at state 209. The determined ECC setting corresponds to the ECC setting used when the data was written to storage array 116.

At state 210, the determined error correction setting is used by the ECC module 125 to decode the accessed data. During the decoding process 210, ECC module 125 determines, using the ECC algorithm originally used to encode the stored data, whether any errors have been found. If a correctable error is detected, the ECC module 125 corrects the error.

At state 211, the decoded data is transmitted to the host system 110 by controller 114 (unless an uncorrectable error was detected, in which case the storage subsystem may return an error message). After this has been completed, the process returns to state 201 and awaits instructions from the host system 110.

Although the ECC levels are specified at the sector level in the illustrated embodiments, this need not be the case. For example, the storage subsystem could be designed such that different ECC levels are used for different blocks of sectors (where one block may, for example, contain 64 or 128 sectors). During high-risk conditions, the controller 114 could then write new data primarily to those blocks that correspond to the highest ECC level or levels.

Figure 3:
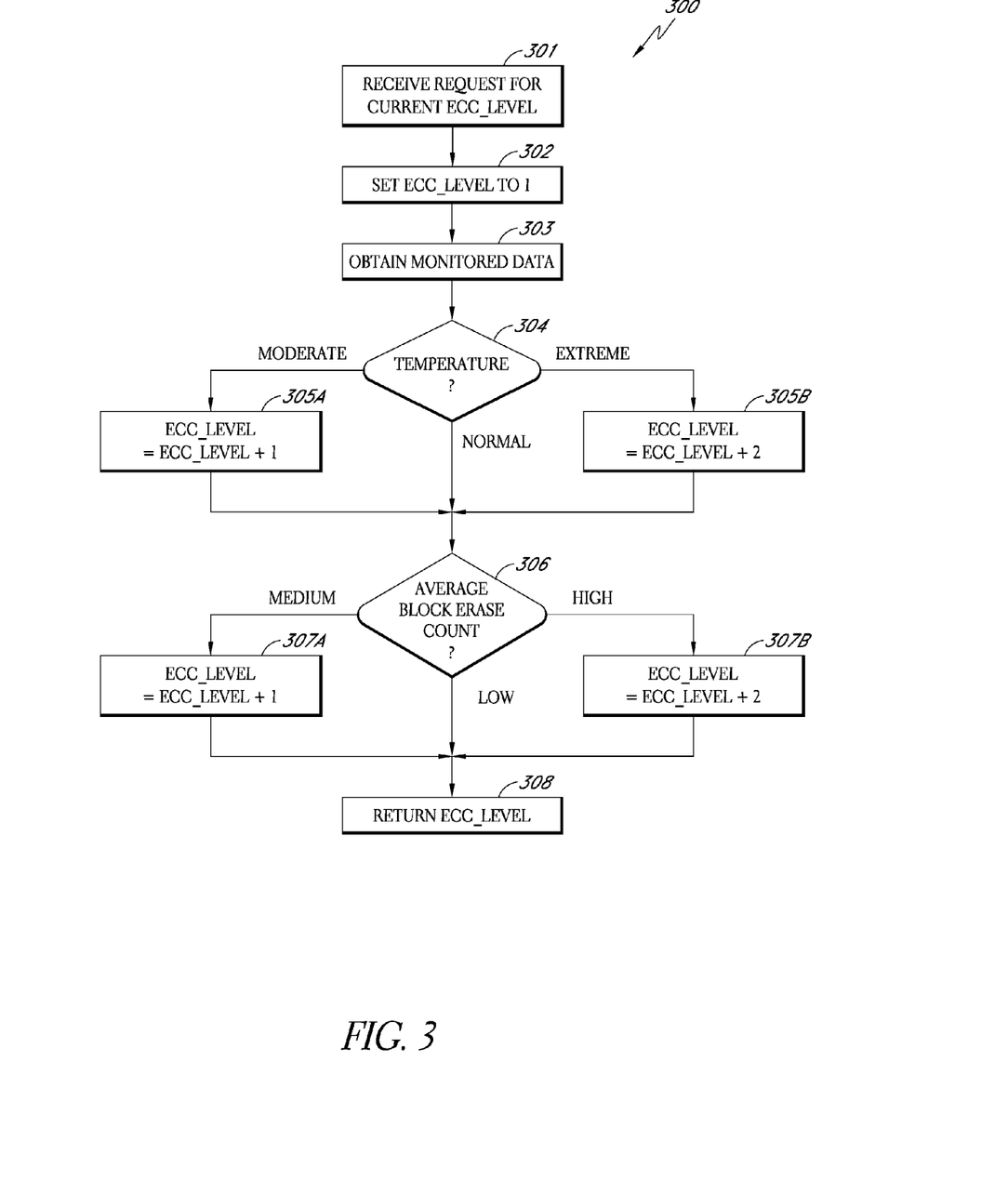
FIG. 3 is a flow chart illustrating a process of automatically selecting an ECC setting based on one or more monitored conditions according to one embodiment.

FIG. 3 shows a flow chart of a process 300 for setting the ECC level according to one embodiment. In this particular embodiment, five ECC levels are used, and the level is selected based on (1) the output of a temperature sensor and (2) the average block erase count of the NMV memory array 116. The process shown in FIG. 3 begins at state 301 when a triggering event occurs that causes the current ECC level to be updated. The triggering event may, for example, be the expiration of a timer, a power-on event, or the detection of some type of anomaly.

At state 302, the variable ECC_Level is initialized to one. At state 303, the monitor data 122 is read from the restricted memory area 120. The monitor data 122 may indicate, in the embodiment shown, the temperature and an average block erase count for the storage array 116. The average block erase count may be maintained by the controller 114 by keeping track of the number times each block of the NVM memory was erased since the manufacture or first use of the storage subsystem, and by averaging these values. The average erase count is one possible measure of the wear level of the memory array, as is known in the art.

At decision state 304, the most recent temperature reading is checked. In the embodiment shown, the temperature level may fall within one or more temperature ranges. The process 300 shown has three ranges, but more or less may be utilized with other embodiments, and precise values for the border between two ranges may be determined based upon the known probability of data errors at different temperatures. In the embodiment shown, it is determined at decision state 304 whether the temperature of the operating environment falls within a normal, moderate, or extreme temperature range. For example, a normal temperature range may correspond to a temperature between 0° C. and 50° C. A moderate temperature range may correspond to temperatures between −40° C. and 0° C. or between 50° C. and 85° C. An extreme temperature range may correspond to temperatures less than −40° C. or more than 85° C. In some embodiments, the past temperature readings may also be taken into consideration so that the decision depends on whether the temperature is currently increasing or decreasing. As illustrated, ECC_Level is incremented by one if the temperature is moderate (block 305A), and by two if the temperature is extreme (block 305B).

At decision state 306, the average block erase count is determined from the monitor data 122. A higher number of block erasures may indicate an increased probability of data errors. The average block erase count is determined to fit within either a low range, a medium range, or a high range. In some embodiments, the determination is based in part on known probabilities of data errors corresponding to average block erase count values. As an example: a low range may correspond to an average block erase count of less than 500,000; a medium block erase count may correspond to an average block erase count of between 500,000 and 1,500,000; and a high block erase count may correspond to an average block erase count of more than 2,000,000. As illustrated, ECC_Level is incremented by one if the average block erase count is medium (block 307A), and by two if the average block erase count is high (block 307B).

At state 308, the current ECC level is set to the value of ECC_Level, which is in the range of 1 to 5. Each such level may correspond to a different respective quantity of ECC bytes or bits. For example, in one embodiment, levels 1, 2, 3, 4 or 5 correspond to two, four, six, eight, and ten ECC bytes respectively.

In some embodiments, the storage subsystem 112 may be programmed to adaptively adjust the function for determining the ECC setting based on monitor data. For example, if the controller 114 detects a sharp increase in ECC errors when the temperature reaches a particular level, the controller may adjust the function to cause the highest level of ECC to be used when this temperature is reached. To enhance this capability, the storage subsystem may store, with each sector of data, several extra bits or bytes indicating the operating conditions (temperature, wear level, etc.) that exist at the time of the write operation. This extra data may later be used by the controller 114 or a host system 110 to detect correlations between ECC error events and specific operating conditions.

Some potential threshold values for certain types of monitor data provided will now be described along with potential error correction settings corresponding to each range. As described above, these different types of monitor data may be combined according to different functions in other embodiments.

For example, a bit error rate may be monitored by the controller 114. A high monitored bit error rate is an indicator of a high future probability of a data error occurring. To compensate for this, the ECC setting may be adjusted.

Extreme temperatures are also related to a higher probability of data errors. For many systems, data integrity is best at around 25° C. For temperature ranges of less than −40° C., between −40° C. and −5° C., between −15° C. and 55° C., between 55° C. and 85° C., and more than 85° C., the number of ECC bytes used may be ten bytes, six bytes, two bytes, six bytes, or ten bytes, respectively.

Similarly, a monitored power supply noise level may correspond to a likelihood of data errors. For a power supply noise level in one of the ranges of less than 100 mV, between 100-150 mV, 150-200 mV, 200-250 mV, or greater than 250 mV the ECC setting may correspond to two, four, six, eight, and ten ECC bytes, respectively. Power supply noise level is one measure of the stability of the power signal; other measures may alternatively be used.

Another indicator of possible data errors is the total amount of time the storage subsystem has been powered ON. As the storage subsystem is powered ON for a longer duration, the probability of a data error occurring increases. In some embodiments, a power ON time in one of the ranges of less than 1,000 hours, between 1,000 and 10,000 hours, between 10,000 and 50,000 hours, between 50,000 and 100,000 hours, or greater than 100,000 hours corresponds to an error correction setting utilizing two, four, six, eight, or ten ECC bytes, respectively.

An average block erase count may also be monitored by the controller 114 and stored in the monitor data 122. As blocks in the storage array 116 are erased and reused more often, the likelihood of data errors increases. For a monitored average erase count in one of the ranges of less than 500,000, between 500,000 and 1 million, between 1 million and 1.5 million, between 1.5 million and 2 million, or more than two million the error correction setting may correspond to two, four, six, eight, or ten ECC bytes, respectively.

The values offered here are for the purposes of explanation only, and some embodiments may determine an error correction setting according to different measured and threshold values or other methods.

Special Modes and Commands

In addition to the functionality described above, the controller 114 may, in some embodiment, implement a set of non-standard or "vendor-specific" commands for enabling the host system 110 to (1) specify the level of ECC to be used on write operations, and/or (2) vary the function used to select the appropriate ECC setting. These commands may supplement the standard ATA or other commands included in the storage subsystem's command set. The following are two examples of non-standard commands that may be included, with parameters shown in parenthesis:

Mode Set (mode, ECC level). This command may be used by the host system 110 to place the storage subsystem in one of two modes: automatic or fixed. In automatic mode, the storage subsystem automatically selects the appropriate ECC level based on one or more monitored conditions, as described above. When the host 110 places the storage subsystem in the fixed mode, it specifies a particular or "fixed" ECC level to be used; this ECC level is then used for all subsequent operations until either (1) the mode is changed back to automatic or (2) the host specifies a different ECC level via the Mode Set command.

Write with Specified ECC Level (data, ECC Level). This command enables the host system 100 to specify the ECC level to be used for a single write operation. The specified ECC level overrides the ECC level that would otherwise be used to perform the write operation.

The host system 110 may use one or both of these commands to vary the ECC level in accordance with the importance of the data being written, and/or in accordance with a desired level of performance. For example, when writing executable code or other "mission critical" information to the storage system, the host 110 may force all write operations to occur at the highest ECC level so that the maximum degree of data protection is provided. One the other hand, when writing non-critical data (e.g., an audio of video stream) that needs to be written or retrieved at a relatively high data rate, the host may force the ECC level to its lowest setting.

Construction of Storage Subsystem

Some additional details of specific embodiments of the storage subsystem 112 will now be described with reference to FIG. 1. As mentioned above, the storage subsystem 112 may be a solid-state memory card or drive that plugs into a slot or port of the host system 110, and may comply with one of the following card specifications: CompactFlash, PCM-CIA, SmartMedia, MultiMediaCard, SecureDigital, Memory Stick, ATA, ATAPI, SATA, PCI Express, PCI Mezzanine Card, and AdvancedTCA Mezzanine Card. The storage subsystem 112 may also have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used. Although the storage subsystem 112 typically includes a physical connector for attaching to the host 110, the storage subsystem 112 may alternatively communication with the host via a wireless interface such as Bluetooth or IEEE-802.11.

In one embodiment, the controller 114 comprises an ATA flash disk controller that executes firmware. The firmware executed by the controller 114 embodies functionality for implementing the features described herein, including providing access to the restricted memory area 120 via vendor-specific commands. The controller 114 may alternatively be implemented in-whole or in-part as an ASIC, FPGA, or other device, which may but need not execute firmware.

The storage array 116 may, but need not, be implemented using NAND memory components. The storage array 116 may comprise a plurality of solid-state storage devices coupled to the controller 114. The storage array 116 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid-state storage devices may be physically divided into blocks, pages and sectors, as is known in the art. As mentioned above, other forms of storage (e.g., battery backed-up volatile DRAM or SRAM devices, magnetic disk drives, etc.) may additionally or alternatively be used.

All possible combinations of the various features and characteristics described herein are contemplated, and are intended to fall within the scope of this disclosure.

The foregoing embodiments have been presented by way of example only, and are not intended to be limiting. Indeed, the novel features described herein may be embodied in a variety of other forms, including forms that do not provide all of the benefits described herein. Furthermore, various omissions, substitutions and changes in the form of the disclosed features may be made without departing from the invention, which is defined by the accompanying claims.

What is claimed is:

1. A storage subsystem, comprising:
non-volatile storage;
a controller connected to the non-volatile storage and configured to write data to and read data from the non-volatile storage in response to instructions and data received from a host system; and
an error correction module configured to generate error correction code (ECC) data based on an ECC setting when the controller writes data to the non-volatile storage, the ECC setting corresponding to one of a plurality of levels of protection;
wherein the controller is capable of selecting said ECC setting based at least in part on one or more monitored operating conditions of the storage subsystem,
wherein the ECC setting corresponds to one of a plurality of possible risk levels, and
wherein the quantity of ECC data generated by the error correction module when data is written to the non-volatile storage is based at least in part on a current one of the plurality of risk levels.

2. The storage subsystem of claim 1, wherein the controller selects the ECC setting based at least in part on one or more monitored operating conditions only when the storage subsystem is in an automatic mode.

3. The storage subsystem of claim 1, wherein the level of protection provided is dependent on the one or more operating condition such that a greater level of protection is provided when the one or more operating condition indicates a greater level of risk.

4. The storage subsystem of claim 1, wherein the non-volatile storage comprises a flash memory device.

5. The storage subsystem of claim 1, wherein the non-volatile storage comprises a hard disk drive.

6. The storage subsystem of claim 1, wherein the error correction module is embedded in the controller.

7. The storage subsystem of claim 1, wherein the error correction module comprises a distinct device connected between the controller and the non-volatile storage.

8. The storage subsystem of claim 1, wherein the non-volatile storage comprises a user data area and a restricted data area, and wherein data indicating the monitored operating conditions of the storage subsystem is stored in the restricted area.

9. The storage subsystem of claim 1, wherein the monitored operating conditions comprise at least one type of monitored information selected from the group of: a bit error rate, a power ON time, a power supply noise level, and a block erase count.

10. The storage subsystem of claim 1, wherein the plurality of possible risk levels comprise five possible risk levels,
and wherein the quantity of ECC data generated for each block of write data comprises two bytes for a first possible risk level, four bytes for a second possible risk level, six bytes for a third possible risk level, eight bytes for a second possible risk level, and ten bytes for a fifth possible risk level.

11. The storage subsystem of claim 1, wherein the error correction module is configured generate at least two bytes of ECC data per unit of data.

12. A storage subsystem, comprising:
non-volatile storage;
a controller connected to the non-volatile storage and configured to write data to and read data from the non-volatile storage in response to instructions and data received from a host system; and
an error correction module configured to generate error correction code (ECC) data based on an ECC setting when the controller writes data to the non-volatile storage, the ECC setting corresponding to one of a plurality of levels of protection;
wherein the controller is capable of selecting said ECC setting based at least in part on one or more monitored operating conditions of the storage subsystem,
wherein the controller is configured to execute a plurality of commands on the non-volatile storage when the ECC setting corresponds to a low risk setting, and
wherein the controller is configured to alter the execution of at least one of the plurality of commands when the ECC setting corresponds to a high risk setting.

13. A storage subsystem, comprising:
non-volatile storage;
a controller connected to the non-volatile storage and configured to write data to and read data from the non-volatile storage in response to instructions and data received from a host system;
an error correction module configured to generate error correction code (ECC) data based on an ECC setting when the controller writes data to the non-volatile storage, the ECC setting corresponding to one of a plurality of levels of protection; and
at least one sensor configured to transmit a signal to the controller indicative of at least one operating condition;
wherein the controller is configured to determine the ECC setting based at least in part on the signal, and
wherein the controller is capable of selecting said ECC setting based at least in part on one or more monitored operating conditions of the storage subsystem.

14. The storage subsystem of claim 13, wherein the at least one sensor comprises one or more sensors selected from the group of: a temperature sensor, a humidity sensor, an altitude sensor, and an accelerometer.

15. A storage subsystem, comprising:
non-volatile storage;
a controller connected to the non-volatile storage and configured to write data to and read data from the non-volatile storage in response to instructions and data received from a host system; and
an error correction module configured to generate error correction code (ECC) data based on an ECC setting when the controller writes data to the non-volatile storage, the ECC setting corresponding to one of a plurality of levels of protection;

wherein the controller is capable of selecting said ECC setting based at least in part on one or more monitored operating conditions of the storage subsystem, wherein the error correction module is configured to encode data written to the non-volatile storage with a first number of ECC bytes when the ECC setting corresponds to a low risk setting, and wherein the controller is configured to encode data written to the non-volatile storage with a second number of ECC bytes when the ECC setting corresponds to a high risk setting, and wherein the second number of ECC bytes is larger than the first number of ECC bytes.

16. The storage subsystem of claim 15, wherein the error correction module is configured to encode data written to the non-volatile storage according to an error correcting code selected from the group of: Hamming code, BCH code, Reed-Solomon code, Reed-Muller code, Binary Golay code, convolutional code, and turbo code.

17. The storage subsystem of claim 15, wherein the ECC setting indicates a high risk setting when a monitored temperature is outside the range of about −15° C. to about 55° C.

18. The storage subsystem of claim 15, wherein the ECC setting indicates a high risk setting when a power supply noise is greater than about 100 mV.

19. The storage subsystem of claim 15, wherein the ECC setting indicates a high risk setting when the storage subsystem has been powered on for more than about 1000 hours.

20. The storage subsystem of claim 15, wherein the ECC setting indicates a high risk setting when an average block erase count of the non-volatile storage is greater than about 500,000.

21. A storage subsystem, comprising:
non-volatile storage;
a controller connected to the non-volatile storage and configured to write data to and read data from the non-volatile storage in response to instructions and data received from a host system; and
an error correction module configured to generate error correction code (ECC) data based on an ECC setting when the controller writes data to the non-volatile storage, the ECC setting corresponding to one of a plurality of levels of protection;
wherein the controller is capable of selecting said ECC setting based at least in part on one or more monitored operating conditions of the storage subsystem,
wherein the error correction module is configured to store ECC metadata in a restricted area of the non-volatile storage when data is written to the non-volatile storage, the ECC metadata comprising the ECC data and indicating the ECC setting.

22. The storage subsystem of claim 21, wherein the error correction module is configured to read the ECC metadata from the restricted area of the non-volatile storage when data is read from the non-volatile storage, and wherein the error correction module is configured to determine whether an error exists based on the ECC metadata.

23. A storage subsystem, comprising:
non-volatile storage;
a controller connected to the non-volatile storage and configured to write data to and read data from the non-volatile storage in response to instructions and data received from a host system; and
an error correction module configured to generate error correction code (ECC) data based on an ECC setting when the controller writes data to the non-volatile storage, the ECC setting corresponding to one of a plurality of levels of protection;
wherein the controller is capable of selecting said ECC setting based at least in part on one or more monitored operating conditions of the storage subsystem,
wherein the quantity of ECC data generated by the error correction module when data is written to the non-volatile storage is based at least in part on a current one of the plurality of risk levels,
wherein the controller implements a first command that allows the host system to place the storage subsystem in a manual mode whereby the ECC setting is indicated by the host system.

24. The storage subsystem of claim 23, wherein the controller implements a second command that allows the host system to place the storage subsystem in the automatic mode.

25. The storage subsystem of claim 23, wherein the first command places the storage subsystem in the manual mode for a single write operation.

26. A storage subsystem, comprising:
a non-volatile memory comprising a user data area, wherein the user data area is accessible by a host system;
a controller connected to the non-volatile memory and configured to receive instructions from the host system, the controller further configured to read data from and write data to the non-volatile memory according to the instructions; and
an error detection and correction module configured to
generate ECC data corresponding to a block of data received from the host system when the controller receives an instruction to write the block of data to the non-volatile memory;
determine a quantity of ECC data to generate based on a current ECC protection level, the current ECC protection level selected from a plurality of predetermined ECC protection levels and selected based at least in part on monitor data indicating one or more operating conditions of the storage subsystem that are associated with the likelihood of a data error;
store the generated ECC data and data indicative of the ECC protection level used to generate the ECC data in a restricted area of the non-volatile memory;
access the stored data indicative of the ECC protection level to determine the ECC protection level used to encode the stored write data;
detect and correct data errors in the stored write data when the controller receives an instruction from the host system to read the stored write data from the non-volatile memory; and
use the stored ECC data according to the ECC protection level used to generate the ECC data in order to detect and correct data errors in the stored write data.

27. The storage subsystem of claim 26, wherein the restricted data area in the non-volatile memory is accessible by the host system according to one or more vendor-specific commands.

28. The storage subsystem of claim 26, wherein the plurality of ECC protection levels correspond to a plurality of possible risk levels, and wherein each of the plurality of possible risk levels corresponds to a likelihood of a data error.

29. A method performed by a controller in a storage subsystem that comprises a non-volatile memory comprising a user data area that is accessible by a host system, the controller connected to the non-volatile memory and configured to receive instructions from the host system and read data from and write data to the non-volatile memory according to the instructions, the method comprising:

generating ECC data corresponding to a block of data received from the host system upon receiving an instruction to write the block of data to the non-volatile memory;

determining a quantity of ECC data to generate based on a current ECC protection level, the current ECC protection level selected from a plurality of predetermined ECC protection levels and selected based at least in part on monitor data indicating one or more operating conditions of the storage subsystem that are associated with the likelihood of a data error;

storing the generated ECC data and data indicative of the ECC protection level used to generate the ECC data in a restricted area of the non-volatile memory;

accessing the stored data indicative of the ECC protection level to determine the ECC protection level used to encode the stored write data;

detecting and correcting data errors in the stored write data upon receiving an instruction from the host system to read the stored write data from the non-volatile memory; and using the stored ECC data according to the ECC protection level used to generate the ECC data in order to detect and correct data errors in the stored write data.

* * * * *